United States Patent
Park

(10) Patent No.: US 8,737,982 B2
(45) Date of Patent: May 27, 2014

(54) METHOD AND APPARATUS FOR REMOTE CONTROLLING BETWEEN MOBILE COMMUNICATION TERMINALS

(75) Inventor: Myoung-Do Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 340 days.

(21) Appl. No.: 13/188,735

(22) Filed: Jul. 22, 2011

(65) Prior Publication Data

US 2012/0077481 A1 Mar. 29, 2012

(30) Foreign Application Priority Data

Sep. 29, 2010 (KR) ........................ 10-2010-0094057

(51) Int. Cl.
*H04M 3/00* (2006.01)

(52) U.S. Cl.
USPC ..... 455/419; 455/412.1; 455/413; 455/414.1; 455/420; 455/445; 455/466; 340/7.52; 340/7.43; 340/7.46; 370/310

(58) Field of Classification Search
CPC ....................................................... H04W 4/12
USPC .............. 455/419, 420, 414.1, 445, 466, 413, 455/412.1; 340/7.52, 7.43, 7.46; 370/310
See application file for complete search history.

(56) References Cited

U.S. PATENT DOCUMENTS 7,602,908 B2 * 10/2009 Pare et al. ........................ 380/37
2008/0218309 A1 * 9/2008 Steenstra et al. ............... 340/5.8

* cited by examiner

*Primary Examiner* — Amancio Gonzalez
(74) *Attorney, Agent, or Firm* — Jefferson IP Law, LLP

(57) ABSTRACT

A method and an apparatus for storing a phone number through remote control between mobile communication terminals are provided. The method includes receiving a message including protocol IDentification (ID) information indicating a pre-arranged remote phone number storage protocol, determining whether a remote phone number storage function is active, comparing authentication information contained in the received message with authentication information of the mobile communication terminal, and storing at least one of a phone number and phone number related information contained in the received message.

22 Claims, 4 Drawing Sheets

METHOD AND APPARATUS FOR REMOTE CONTROLLING BETWEEN MOBILE COMMUNICATION TERMINALS

PRIORITY

This application claims the benefit under 35 U.S.C. §119(a) of a Korean patent application filed in the Korean Intellectual Property Office on Sep. 29, 2010, and assigned Serial No. 10-2010-0094057, the entire disclosure of which is hereby incorporated by reference.

BACKGROUND OF THE INVENTION

1. Field of the Invention

The present invention relates to a method and an apparatus for remote controlling between mobile communication terminals. More particularly, the present invention relates to a method and an apparatus for storing a phone number through remote control between mobile communication terminals.

2. Description of the Related Art

Recently, as mobile communication systems have advanced rapidly, mobile communication terminals providing various additional functions have increased. However, some classes of people such as older persons or blind persons have complications and difficulty in manipulating the mobile communication terminal and thus cannot use most of the various additional functions, but manage to use only some easy functions, for example, a call function.

More particularly, to easily utilize the mobile communication terminal, it is important to store phone numbers to the mobile communication terminal. However, the process for storing the phone number to the mobile communication terminal is complicated for some users. For example, the process for storing the phone number of the mobile communication terminal includes inputting, by a user, a phone number of a counterpart, selecting a phone number store menu by manipulating a menu, and inputting other information such as name of the counterpart or storing the phone number by synchronizing with a Personal Computer (PC). However, since these operations are difficult to use by users who are not familiar with the manipulation of the mobile communication terminal, the users may use the operations by receiving help from other persons to store the phone number to the mobile communication terminal. However, in some cases, the users may not be able to receive help from other persons. In this case, the users are subject to the having difficulty in storing the phone number to the mobile communication terminal

SUMMARY OF THE INVENTION

Aspects of the present invention are to address at least the above-mentioned problems and/or disadvantages and to provide at least the advantages described below. Accordingly, an aspect of the present invention is to provide a method and an apparatus for storing data through remote control between mobile communication terminals.

Another aspect of the present invention is to provide a method and an apparatus for storing a phone number through remote control between mobile communication terminals.

Yet another aspect of the present invention is to provide a method and an apparatus for storing a phone number by transmitting and receiving messages between mobile communication terminals.

In accordance with an aspect of the present invention, a method for storing a phone number in a mobile communication terminal is provided. The method includes receiving a message including protocol IDentification (ID) information indicating a pre-arranged remote phone number storage protocol, determining whether a remote phone number storage function is active, comparing authentication information contained in the received message with authentication information of the mobile communication terminal, and storing at least one of a phone number and phone number related information contained in the received message.

In accordance with another aspect of the present invention, a method for storing a remote phone number in a mobile communication terminal is provided. The method includes inputting, from a user, at least one of a phone number to store to an opponent terminal and phone number related information, generating a message including at least one of the phone number to store to an opponent terminal and the phone number related information, protocol ID information for a pre-arranged remote phone number storage protocol, and authentication information, and transmitting the generated message to the opponent terminal.

In accordance with yet another aspect of the present invention, an apparatus for storing a phone number in a mobile communication terminal is provided. The apparatus includes a communication unit for receiving a message including protocol ID information indicating a pre-arranged remote phone number storage protocol, a storage unit for storing a phone number and phone number related information, and a controller for determining whether a remote phone number storage function is active, for comparing authentication information contained in the received message with authentication information of the mobile communication terminal, and for storing at least one of the phone number and the phone number related information contained in the received message, to the storage unit.

In accordance with still another aspect of the present invention, an apparatus for storing a remote phone number in a mobile communication terminal is provided. The apparatus includes an input unit for receiving from a user, at least one of a phone number to store to an opponent terminal and phone number related information, a controller for generating a message including at least one of the phone number to store to an opponent terminal and the phone number related information, protocol ID information for a pre-arranged remote phone number storage protocol, and authentication information, and a communication unit for transmitting the generated message to the opponent terminal under control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It is also to be understood that the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

Exemplary embodiments of the present invention provide a method and an apparatus for storing a phone number by transmitting and receiving messages between mobile communication terminals.

Figure 1:
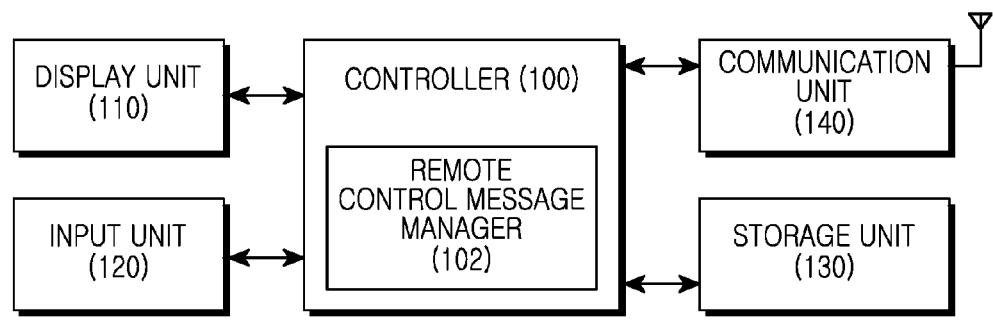
FIG. 1 is a block diagram of a mobile communication terminal according to an exemplary embodiment of the present invention.

FIG. 1 is a block diagram of a mobile communication terminal according to an exemplary embodiment of the present invention.

Referring to FIG. 1, the mobile communication terminal includes a controller 100, a display unit 110, an input unit 120, a storage unit 130, and a communication unit 140. The controller 100 includes a remote control message manager 102.

The controller 100 controls operations of the terminal. The controller 100, which includes the remote control message manager 102, controls and processes to generate a remote phone number storage message for storing a phone number to an opponent terminal or to store a phone number to the storage unit 130 by analyzing the remote phone number storage message received from the opponent terminal.

More specifically, when a remote phone number storage message generation event takes place according to a user's manipulation, the remote control message manager 102 controls to display a message generation window in the display unit 110 according to a preset remote phone number storage protocol, and controls and processes to generate the remote phone number storage message including a phone number of the opponent terminal, which is a remote control target, input through the input unit 120, a phone number and a name to store to the opponent terminal, and other additional information.

Figure 2:
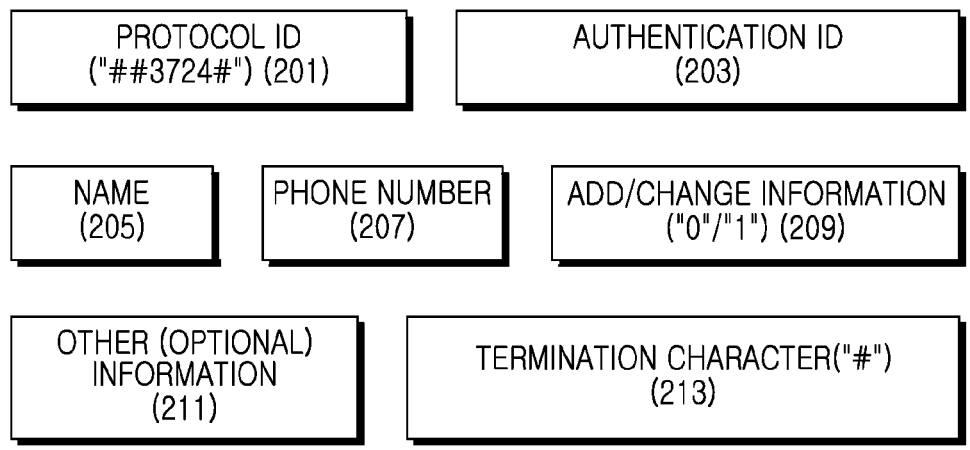
FIG. 2 is a diagram of a remote phone number storage protocol in a mobile communication terminal according to an exemplary embodiment of the present invention.

FIG. 2 is a diagram of a remote phone number storage protocol in a mobile communication terminal according to an exemplary embodiment of the present invention.

Referring to FIG. 2, the remote phone number storage message can include a protocol IDentification (ID) (e.g., ##3724#) 201, an authentication ID 203, a name 205, a phone number 207, add/change information 209, other (optional) information 211, and a termination character (e.g., #) 213 as illustrated in FIG. 2. Herein, the protocol ID 201 indicates an ID of a predefined protocol for storing the remote phone number, and is contained in the start unit of the remote phone number storage message to signify that the corresponding message is the remote phone number storage message. The authentication ID 203, as the ID for remotely controlling the opponent terminal, can be the phone number of the mobile communication terminal or a code preset in the opponent terminal. The preset code can include at least one of a numeral and a character. The name 205 indicates a user name of the phone number to store to the opponent terminal, and the phone number 207 indicates the phone number to store to the opponent terminal The add/change information 209 indicates whether to newly store the information contained in the message to the opponent terminal or to modify the pre-stored information, and can be set to 0 or 1 to indicate the add/change of the corresponding information. The other (optional) information 211, which is additional information to store to the opponent terminal, can include information, for example, e-mail address, date of birth, photo, and memo of the user of the phone number to store. Herein, the other (optional) information 211 can be omitted. The termination character 213 indicates the termination of the remote phone number storage message, and data after the termination character is ignored. The information in the remote phone number storage message can be distinguished by a preset delimiter (e.g., ","), and their order should match the order described in the protocol.

When receiving the remote phone number storage message from the opponent terminal, the remote control message manager 102 determines whether the received message is valid by analyzing the received message. That is, the remote control message manager 102 determines whether the remote phone number storage message is written according to the remote phone number storage protocol. When the message is written according to the remote phone number storage protocol, the remote control message manager 102 determines that the receive message is the valid message. When the message is not written according to the remote phone number storage protocol, the remote control message manager 102 determines that the receive message is not the valid message.

When the received message is not the valid message, the remote control message manager 102 discards the received message and controls and processes to inform that the storing of the remote phone number is attempted, but the corresponding message is not valid. In contrast, when the received message is the valid message, the remote control message manager 102 determines whether a remote phone number storage function of the mobile communication terminal is active. If it is determined that the remote phone number storage function of the mobile communication terminal is inactive, the remote control message manager 102 discards the received message and controls and processes to inform the user that the storing of the remote phone number is attempted but the corresponding function is inactive.

In contrast, when the remote phone number function of the mobile communication terminal is active, the remote control message manager 102 confirms an authentication ID contained in the received message and then determines whether a preset authentication ID is the same as the authentication ID contained in the received message. Herein, the preset authentication ID can be set and changed by the user of the mobile communication terminal, and an initial value of the authentication ID can be set to an empty string in order to prevent illegal access. Accordingly, although the remote phone number storage function of the mobile communication terminal is active, when the authentication ID set in the mobile communication terminal is the empty string, the remote control message manager 102 does not conduct the remote phone number storage function. If it is determined that the preset authentication ID is not the same as the authentication ID contained in the received message, the remote control message manager 102 discards the received message, and controls and processes to inform that an unauthorized user attempts to store the remote phone number.

When the preset authentication ID is the same as the authentication ID contained in the received message, the remote control message manager 102 controls and processes to store the information contained in the received message to a phone book. In so doing, according to the add/change information in the received message, the remote control message manager 102 may newly store the phone number, the name, and other information of the received message to the phone book, and can retrieve from the phone book the same phone number or name as the phone number or name contained in the received message and change other information mapped to the retrieved message with the information contained in the received message.

Herein, if it is determined that the authentication ID of the received message is the same as the preset authentication ID and the received message is the invalid message or the remote phone number storage function is turned off, the remote control message manager 102 controls and processes to transmit a message informing of the reason for the remote phone number storage failure, to the opponent terminal which transmits the message.

The display unit 110 displays state information, character, numeral, and various images generating during the operations of the terminal. Under control of the controller 100, the display unit 110 displays the remote phone number storage message generation window. Also, under the control of the controller 100, the display unit 110 displays the message informing that the message for the remote phone number storage is received from the opponent terminal but the remote phone number storage fails.

The input unit 120 includes a key pad including at least one key, or a touch sensor for detecting a user's touch, and provides the controller 100 with data corresponding to the key pressed by the user or coordinates corresponding to the user's touch location. More particularly, the input unit 120 can receive from the user, the phone number, the name, the add/change information, other information, and the authentication ID.

The storage unit 130 stores programs and data for the operations of the terminal, and temporarily stores data generating in the operations of the terminal. Under the control of the remote control message manager 102, the storage unit 130 additionally stores or modifies and stores the phone number and the phone number related information of the message received from the opponent terminal to the phone book.

The communication unit 140 processes data transmitted and received over a radio channel environment. That is, the communication unit 140 up-converts a baseband signal output from the controller 100 to a radio frequency signal and transmits the radio frequency signal to the radio channel environment via an antenna. The communication unit 140 down-converts a radio frequency signal received via the antenna to a baseband signal and provides the baseband signal to the controller 100. More particularly, the communication unit 140 processes to transmit and receive the remote phone number storage message under the control of the controller 100.

Figure 3:
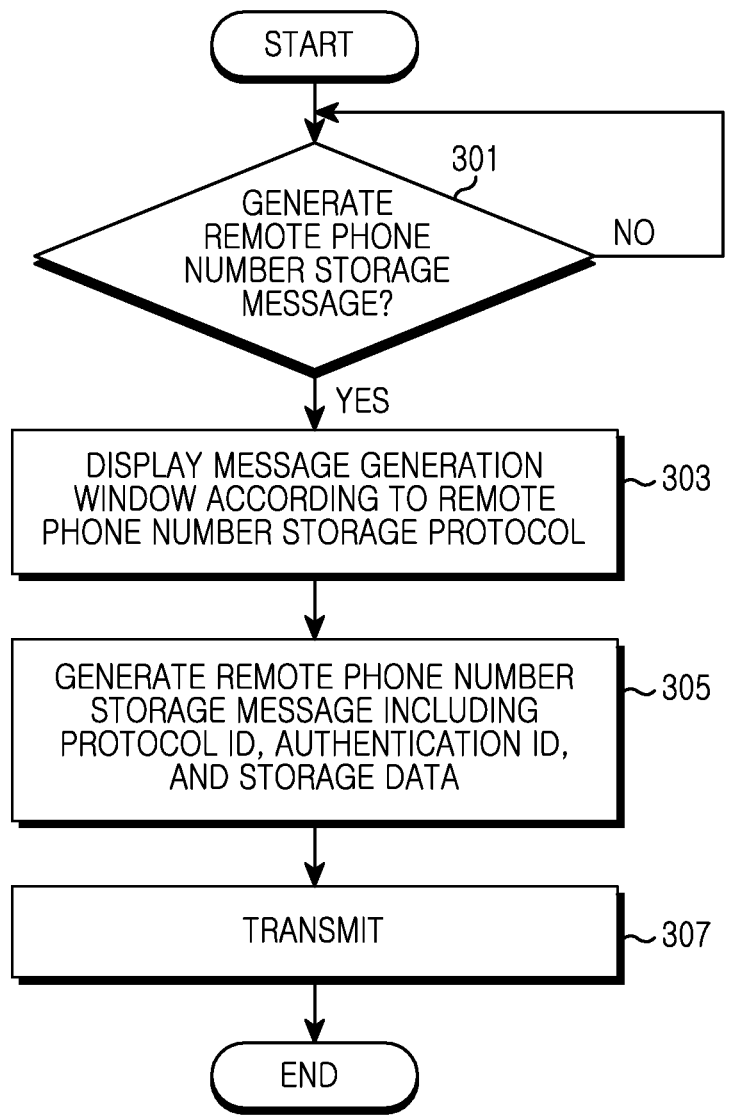
FIG. 3 is a flowchart of a control method for storing a remote phone number in a mobile communication terminal according to an exemplary embodiment of the present invention.

FIG. 3 is a flowchart of a control method for storing a remote phone number in a mobile communication terminal according to an exemplary embodiment of the present invention.

Referring to FIG. 3, in step 301, the mobile communication terminal determines whether an event for generating the remote phone number storage message occurs according to the user's manipulation.

If it is determined that the event for generating the remote phone number storage message takes place, the mobile communication terminal displays a message generation window according to the remote phone number storage protocol in step 303. In step 305, the mobile communication terminal receives from the user, the storage data (e.g., phone number, name, add/change information, e-mail, date of birth, photo, memo, and the like) to store to an opponent terminal, and generates the remote phone number storage message including a protocol ID, an authentication ID, and storage data. That is, the mobile communication terminal generates the remote phone number storage message including the protocol ID (e.g., ##3724) 201, the authentication ID 203, the name 205, the phone number 207, the add/change information 209, the other (optional) information 211, and the termination character (e.g., #) 213 as illustrated in FIG. 2.

Herein, the remote phone number storage message generation window can represent the protocol ID, the authentication ID, and the termination character. Notably, although the message generation window does not represent the protocol ID, the authentication ID, and the termination character, the remote phone number storage message still includes the protocol ID, the authentication ID, and the termination character. When the authentication ID adopts the phone number of the mobile communication terminal, the remote phone number storage message generation window can include the authentication ID in advance. When the authentication ID does not use the phone number of the mobile communication terminal, the authentication ID should be input from the user. That is, depending on the design manner of a designer, the authentication ID can be included in the remote phone number storage message generation window in advance, or input from the user.

After generating the remote phone number storage message, the mobile communication terminal transmits the remote phone number storage message to the opponent terminal which is the remote control target in step 307, and ends the process.

Figure 4:
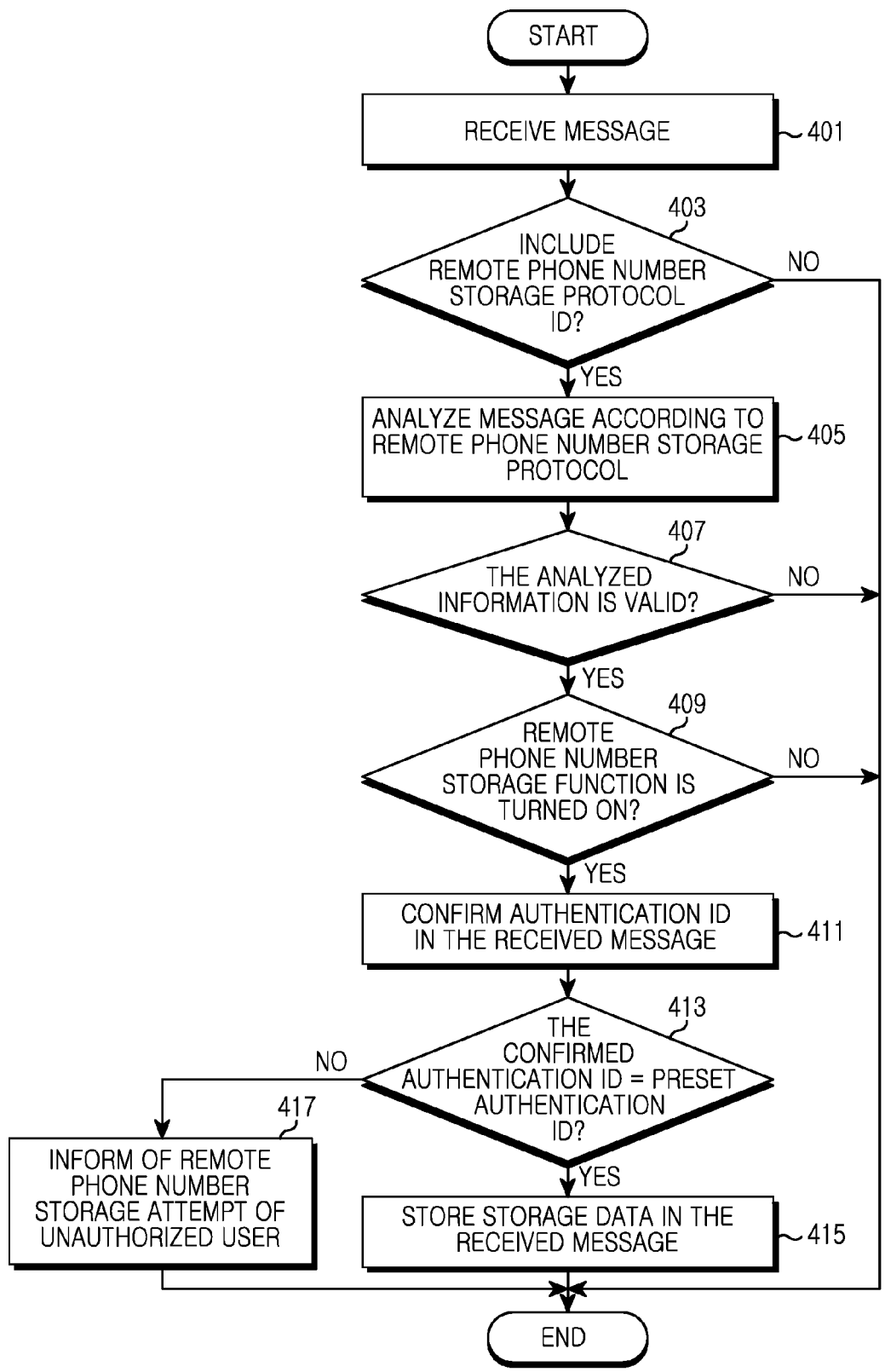
FIG. 4 is a flowchart of a method for storing a remote phone number in a mobile communication terminal according to an exemplary embodiment of the present invention.

FIG. 4 is a flowchart of a method for storing a remote phone number in the mobile communication terminal according to an exemplary embodiment of the present invention.

Referring to FIG. 4, the mobile communication terminal receives a message from an opponent terminal in step 401, and determines whether the received message includes a remote phone number storage protocol ID in step 403. If it is determined that the received message does not include the remote phone number storage protocol ID, the mobile communication terminal ends the process and processes the received message according to the related art method.

In contrast, if it is determined that the received message includes the remote phone number storage protocol ID, the mobile communication terminal analyzes the received message in conformity with the remote phone number storage protocol in step 405 and examines whether the analyzed information is valid in step 407. More specifically, the mobile communication terminal determines whether the remote phone number storage message is generated according to the remote phone number storage protocol. When the message is generated according to the remote phone number storage protocol, the mobile communication terminal determines that the analyzed information is valid. When the message is not generated according to the remote phone number storage protocol, the mobile communication terminal determines that the analyzed information is invalid. Herein, upon determining that the analyzed information is invalid, the mobile communication terminal discards the received message, informs that the remote phone number storage is attempted but the corresponding message is not valid, and ends the process.

When determining that the analyzed information is valid, the mobile communication terminal determines whether the remote phone number storage function is active (i.e., an ON state) in step 409. When the remote phone number storage function is inactive, the mobile communication terminal discards the received message, informs the user that the remote phone number storage is attempted, but the corresponding function is inactive, and ends the process.

In contrast, if it is determined that the remote phone number storage function is active, the mobile communication terminal confirms the authentication ID in the received message in step 411 and determines whether the authentication ID contained in the received message is the same as the preset authentication ID in step 413. Herein, the present authentication ID can be set and changed by the user of the mobile communication terminal, and defined as the phone number of another mobile communication terminal or a code including a digit string, a character string, or a combination of the digits and the characters. To prevent illegal access, the initial value of the authentication ID can be set to an empty string.

If it is determined that the authentication ID contained in the received message is not the same as the preset authentication ID according to the examination result, the mobile communication terminal discards the received message, informs that the unauthorized user attempts the remote phone number storage in step 417, and ends the process.

In contrast, if it is determined that the authentication ID contained in the received message is the same as the preset authentication ID according to the examination result, the mobile communication terminal stores the information contained in the received message to the phone book in step 415. In so doing, according to the add/change information in the received message, the mobile communication terminal may newly store the phone number, the name, and the other information of the received message to the phone book, and can retrieve from the phone book the same phone number or name as the phone number or name contained in the received message and change other information mapped to the retrieved information with the information contained in the received message.

Thereafter, the mobile communication terminal ends the process.

Herein, if it is determined that the authentication ID contained in the received message is the same as the preset authentication ID, but the received message is the invalid message or the remote phone number storage function is turned off, the mobile communication terminal may transmit, to the opponent terminal transmitting the message, a message informing of the reason of the remote phone number storage failure.

When the mobile communication terminal provides the message generation window for storing the remote phone number and the user inputs the phone number of the terminal to control, the phone number to store, the name, and the other information in the message generation window, the mobile communication terminal generates the message according to the remote phone number storage protocol and transmits the generated message to the opponent terminal. Even when the mobile communication terminal does not provide the message generation window for storing the remote phone number, the user may acquire the remote phone number storage protocol and directly generate the message in conformity with the remote phone number storage protocol. For example, the user may be able to generate the remote phone number storage message in person by inputting the remote phone number storage protocol ID, the authentication ID, the name, the phone number, the add/change information, the other (optional) information, and the termination character. The information input by the user should be distinguished by a preset delimiter (e.g., ",") and its order should match the order defied in the protocol.

As set forth above, since the phone number is stored by transmitting and receiving the messages between the mobile communication terminals, it is possible to enhance the convenience of users who are not familiar with the manipulation of the mobile communication terminal to store the phone number, or the users who have difficulty in a normal manipulation of the mobile communication terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for storing a remote message in a mobile communication terminal, the method comprising:
receiving a remote message comprising a protocol IDentification (ID) indicating a need to store at least part of the remote message on the mobile communication terminal;
if the protocol ID indicates the need to store the received remote message, reading the at least part of the remote message to be stored in the mobile communication terminal; and
storing the at least part of the remote message by initiating a storage function of the mobile communication terminal.

2. The method of claim 1, wherein the received remote message comprises at least one of protocol ID information, authentication information, a name, a phone number, add/ change information, other additional information of the received remote message, and a termination character.

3. The method of claim 1, further comprising:
determining whether the at least part of a remote message storage function is activate; and
if the at least part of the remote message storage function is inactive, discarding the received remote message.

4. The method of claim 1, further comprising:
comparing authentication information contained in the received remote message with authentication information of the mobile communication terminal; and
if the authentication information contained in the received remote message does not match the authentication information of the mobile communication terminal, discarding the received remote message.

5. The method of claim 4, wherein the authentication information of the mobile communication terminal comprises an initial value set to an empty string.

6. The method of claim 4, wherein the authentication information of the mobile communication terminal is at least one of a phone number of another mobile communication terminal, a digit string, a character string, and a combination of digits and characters.

7. The method of claim 3, further comprising:
if the at least part of the remote message storage function is inactive, informing a terminal, which transmits the received remote message, that the at least part of remote message storage function is inactive.

8. The method of claim 3, further comprising:
if the at least part of the remote message storage function is activate, storing the at least part of the remote message by initiating the storage function of the mobile communication terminal.

9. The method of claim 4, further comprising:
if the authentication information contained in the received remote message matches the authentication information of the mobile communication terminal, storing the at least part of the remote message by initiating the storage function of the mobile communication terminal.

10. A method for storing a remote message in a mobile communication terminal, the method comprising:
inputting, from a user, at least part of a remote message to store to an opponent terminal;
generating a remote message comprising a protocol IDentification (ID) that indicates the need to store at least part of the remote message; and
transmitting the generated remote message to the opponent terminal.

11. The method of claim 10, wherein the remote message comprises at least one of protocol ID information, authentication information, a name, a phone number, add/change information, other additional information of the remote message, and a termination character.

12. An apparatus for storing a remote message in a mobile communication terminal, the apparatus comprising:
a communication unit configured to receive a remote message comprising protocol IDentification (ID) that indicates a need to store at least part of the remote message in the mobile communication terminal;
a storage unit configured to store the at least part of the received remote message; and
a controller configured to store the at least part of the received remote message, if the protocol ID indicates the need to store the received remote message, to the storage unit.

13. The apparatus of claim 12, wherein the received remote message comprises at least one of protocol ID information, authentication information, a name, a phone number, add/change information, other additional information of the received remote message, and a termination character.

14. The apparatus of claim 12, further comprising:
a controller configured to determine whether the at least part of a remote message storage function is active; and
if the at least part of the remote message storage function is inactive, the controller discards the received remote message.

15. The apparatus of claim 12, further comprising:
a controller configured to compare authentication information contained in the received remote message with authentication information of the mobile communication terminal; and
if the authentication information contained in the received remote message does not match the authentication information of the mobile communication terminal, the controller discards the received remote message.

16. The apparatus of claim 15, wherein the authentication information of the mobile communication terminal comprises an initial value of set to an empty string.

17. The apparatus of claim 15, wherein the authentication information of the mobile communication terminal is at least one of a phone number of another mobile communication terminal, a digit string, a character string, and a combination of digits and characters.

18. The method of claim 14, wherein, if the at least part of the remote message storage function is inactive, the controller controls the communication unit to inform a terminal, which transmits the received remote message, that the at least part of the remote message storage function is inactive.

19. The apparatus of claim 14, wherein if the at least part of the remote message storage function is activate, the controller stores the at least part of the received remote message to the storage unit.

20. The apparatus of claim 15, wherein if the authentication information contained in the received remote message does not match the authentication information of the mobile communication terminal, the controller stores the at least part of the received remote message to the storage unit.

21. An apparatus for storing a remote message in a mobile communication terminal, the apparatus comprising:
an input unit configured to receive from a user, at least part of a remote message that indicates a need to store to an opponent terminal;
a controller configured to generate a remote message comprising a protocol IDentification (ID) that indicates the need to store at least part of the remote message; and
a communication unit for transmitting the generated remote message to the opponent terminal under control of the controller.

22. The apparatus of claim 21, wherein the remote message comprises at least one of protocol ID information, authentication information, a name, a phone number, add/change information, other additional information of the remote message, and a termination character.

* * * * *